(12) United States Patent
Hayashi et al.

(10) Patent No.: US 11,479,256 B2
(45) Date of Patent: Oct. 25, 2022

(54) CONTROL DEVICE

(71) Applicant: AISAN KOGYO KABUSHIKI KAISHA, Obu (JP)

(72) Inventors: Shintaro Hayashi, Obu (JP); Kazunori Ito, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/349,151

(22) Filed: Jun. 16, 2021

(65) Prior Publication Data

US 2022/0009497 A1 Jan. 13, 2022

(30) Foreign Application Priority Data

Jul. 8, 2020 (JP) .............................. JP2020-117650

(51) Int. Cl.
*B60W 30/192* (2012.01)
*B60W 10/06* (2006.01)
*B60W 10/08* (2006.01)

(52) U.S. Cl.
CPC .......... *B60W 30/192* (2013.01); *B60W 10/06* (2013.01); *B60W 10/08* (2013.01); *B60W 2510/244* (2013.01); *B60W 2540/10* (2013.01); *B60W 2710/0605* (2013.01); *B60W 2710/0644* (2013.01)

(58) Field of Classification Search
CPC .... B60W 30/192; B60W 10/06; B60W 10/08; B60W 2510/244; B60W 2510/10; B60W 2710/0605; B60W 2710/0644; B60W 20/10; B60W 2050/021; B60W 50/0205; B60W 2050/005; B60W 2050/0604; B60W 2050/0638; B60W 2050/0657; F02D 2009/0259; F02D 2009/0284
See application file for complete search history.

(56) References Cited

U.S. PATENT DOCUMENTS 6,330,498 B2 * 12/2001 Tamagawa ............ B60W 10/06
903/945
10,077,728 B1 * 9/2018 Ren ........................ B60W 20/13
(Continued)

FOREIGN PATENT DOCUMENTS

JP      H06-93923 A     4/1994
JP      2017-047788 A   3/2017

*Primary Examiner* — George C Jin
(74) *Attorney, Agent, or Firm* — Shumaker, Loop & Kendrick, LLP (57) ABSTRACT

A control device that may be a control device of a hybrid vehicle. The hybrid vehicle including an engine; an electric generator configured to generate electric power by operation of the engine; a battery configured to store the electric power; a traction motor configured to operate by the electric power stored in the battery; and a throttle valve configured to adjust an amount of air to be supplied to the engine. The control device is configured to estimate torque of the engine based on an output current value of the electric generator. The control device is configured to estimate an actual aperture of the throttle valve based on the estimated torque and revolution speed of the engine. The control device is configured to perform feedback control so that the aperture of the throttle valve is adjusted to the target aperture based on the estimated actual aperture.

5 Claims, 5 Drawing Sheets

(56) References Cited

U.S. PATENT DOCUMENTS

2014/0121871 A1\* 5/2014 Kim ................. B60W 10/26
180/65.265
2014/0365054 A1\* 12/2014 Yamamoto ........... B60W 10/06
701/22

\* cited by examiner

CONTROL DEVICE

CROSS-REFERENCE TO RELATED APPLICATION

This application claims priority to Japanese Patent Application No. 2020-117650 filed on Jul. 8, 2020, the entire contents of which are hereby incorporated by reference into the present application.

TECHNICAL FIELD

This disclosure herewith relates to a control device.

BACKGROUND

Japanese Patent Application Publication No. H6-93923 describes a control device. The control device adjusts an aperture of a throttle valve. When the aperture of the throttle valve is adjusted, an amount of air flowing in an engine is adjusted. The control device normally calculates the aperture of the throttle valve using an aperture sensor that detects the aperture of the throttle valve. Further, when the aperture sensor fails, the control device calculates the aperture of the throttle valve using a pressure sensor that detects a pressure of the air flowing in the engine.

SUMMARY

In the technique of Japanese Patent Application Publication No. H6-93923 as above, when the pressure sensor also fails, the control device cannot calculate the aperture of the throttle valve. Due to this, the aperture of the throttle valve cannot be adjusted accurately.

The disclosure herein provides art to accurately adjust an aperture of a throttle valve without using an aperture sensor or a pressure sensor.

A control device disclosed herein is a control device of a hybrid vehicle, the hybrid vehicle comprising: an engine; an electric generator configured to generate electric power by operation of the engine; a battery configured to store the electric power generated by the electric generator; a traction motor configured to operate by the electric power stored in the battery; and a throttle valve configured to adjust an amount of air to be supplied to the engine. The control device is configured to control an aperture of the throttle valve to a target aperture. The control device is configured to estimate torque of the engine based on an output current value of the electric generator while the battery is charged with the electric power. The control device is configured to estimate an actual aperture of the throttle valve based on the estimated torque and revolution speed of the engine. The control device is configured to perform feedback control so that the aperture of the throttle valve is adjusted to the target aperture based on the estimated actual aperture.

According to this configuration, the control device estimates the actual aperture of the throttle valve using the output current value of the electric generator while the battery is charged with the electric power. The output current value of the electric generator is correlated with an output of the engine (that is, the torque thereof). Further, the output of the engine is correlated with the amount of air supplied to the engine (that is, the aperture of the throttle valve). Due to this, the aperture of the throttle valve (that is, the actual aperture) can be estimated based on the output current value of the electric generator. The control device as above exploits these relationships to accurately adjust the aperture of the throttle valve without using an aperture sensor or a pressure sensor.

The control device may be configured to supply the electric power stored in the battery to the electric generator. The electric generator may be configured to forcibly operate the engine by the supplied electric power in a state in which fuel is not supplied to the engine. The control device is configured to adjust the aperture of the throttle valve to a first aperture when the engine is stopped. The control device may be configured to supply the electric power stored in the battery to the electric generator and adjust the revolution speed of the engine from zero to a first revolution speed in the state in which the fuel is not supplied to the engine. The control device may be configured to estimate the actual aperture of the throttle valve at the first revolution speed. The control device may be configured to perform feedback control so that the aperture of the throttle valve is adjusted to the target aperture based on the estimated actual aperture.

According to this configuration, when the battery is not charged with the electric power, that is, when the engine is stopped, the control device forcibly operates the engine using the electric power stored in the battery. Due to this, the control device can estimate the actual aperture of the throttle valve before the engine starts to operate using fuel supplied thereto. As a result, when the engine operates to charge the battery with the electric power (that is, when the engine operates by the fuel supplied to the engine), the control device can accurately adjust the aperture of the throttle valve.

The hybrid vehicle may further comprise an accelerating operation detector configured to detect an operation amount of an acceleration member operated by a driver. The control device may be configured to calculate the target aperture of the throttle valve based on the operation amount detected by the accelerating operation detector and an amount of the electric power remaining in the battery. The control device may be configured to perform feedback control so that the aperture of the throttle valve is adjusted to the target aperture based on the estimated actual aperture.

According to this configuration, the target aperture of the throttle valve is calculated based on the operation amount detected by the accelerating operation detector and the amount of electric power remaining in the battery. Due to this, the control device can accurately adjust the aperture of the throttle valve to the target aperture based on the estimated actual aperture of the throttle valve.

The control device may be configured to determine that the throttle valve is malfunctioning in a case in which a period during which a difference between the estimated actual aperture and the target aperture is equal to or greater than a first aperture difference continues for a first period while the battery is charged with the electric power.

According to this configuration, the control device determines whether the throttle valve is malfunctioning based on the actual aperture of the throttle valve estimated while the battery is charged with the electric power. Due to this, determination on whether the throttle valve is malfunctioning can be made without using the aperture sensor.

The control device may be configured to supply the electric power stored in the battery to the electric generator and adjust the revolution speed of the engine to a second revolution speed from a state in which the engine is stopped. The control device may be configured to determine that the throttle valve is malfunctioning in a case in which a period during which the estimated actual aperture is smaller than or equal to a third aperture that is smaller than a second aperture continues for a second period within a control period during which the aperture of the throttle valve is controlled to the second aperture corresponding to the second revolution speed.

According to this configuration, the control device determines whether the throttle valve is malfunctioning based on the actual aperture of the throttle valve estimated while the engine is forcibly operated. Due to this, the determination on whether the throttle valve is malfunctioning can be made without using the aperture sensor.

The hybrid vehicle may further comprise a throttle motor configured to operate the throttle valve. The control device may be configured to determine that the throttle valve is malfunctioning in a case in which a period during which the difference between the estimated actual aperture and the target aperture is equal to or greater than the first aperture difference continues for the first period and a current value of the throttle motor is equal to or greater than a first current value while the battery is charged with the electric power.

According to this configuration, the control device determines whether the throttle valve is malfunctioning based on the current value of the throttle motor and the actual aperture of the throttle valve estimated while the battery is charged with the electric power. Due to this, more accurate determination on whether the throttle valve is malfunctioning can be made without using the aperture sensor.

The hybrid vehicle may further comprise a throttle motor configured to operate the throttle valve. The control device may be configured to determine that the throttle valve is malfunctioning in a case in which the period during which the estimated actual aperture is smaller than or equal to the third aperture continues for the second period and a current value of the throttle motor is equal to or greater than a second current value.

According to this configuration, the control device determines whether the throttle valve is malfunctioning based on the current value of the throttle motor and the actual aperture of the throttle valve estimated while the engine is forcibly operated. Due to this, more accurate determination on whether the throttle valve is malfunctioning can be made without using the aperture sensor.

DETAILED DESCRIPTION

Embodiment

A hybrid vehicle 2 of an embodiment will be described with reference to FIGS. 1 to 5. The hybrid vehicle 2 is a vehicle configured to travel using electric power generated by operation of an engine 10.

Figure 1:
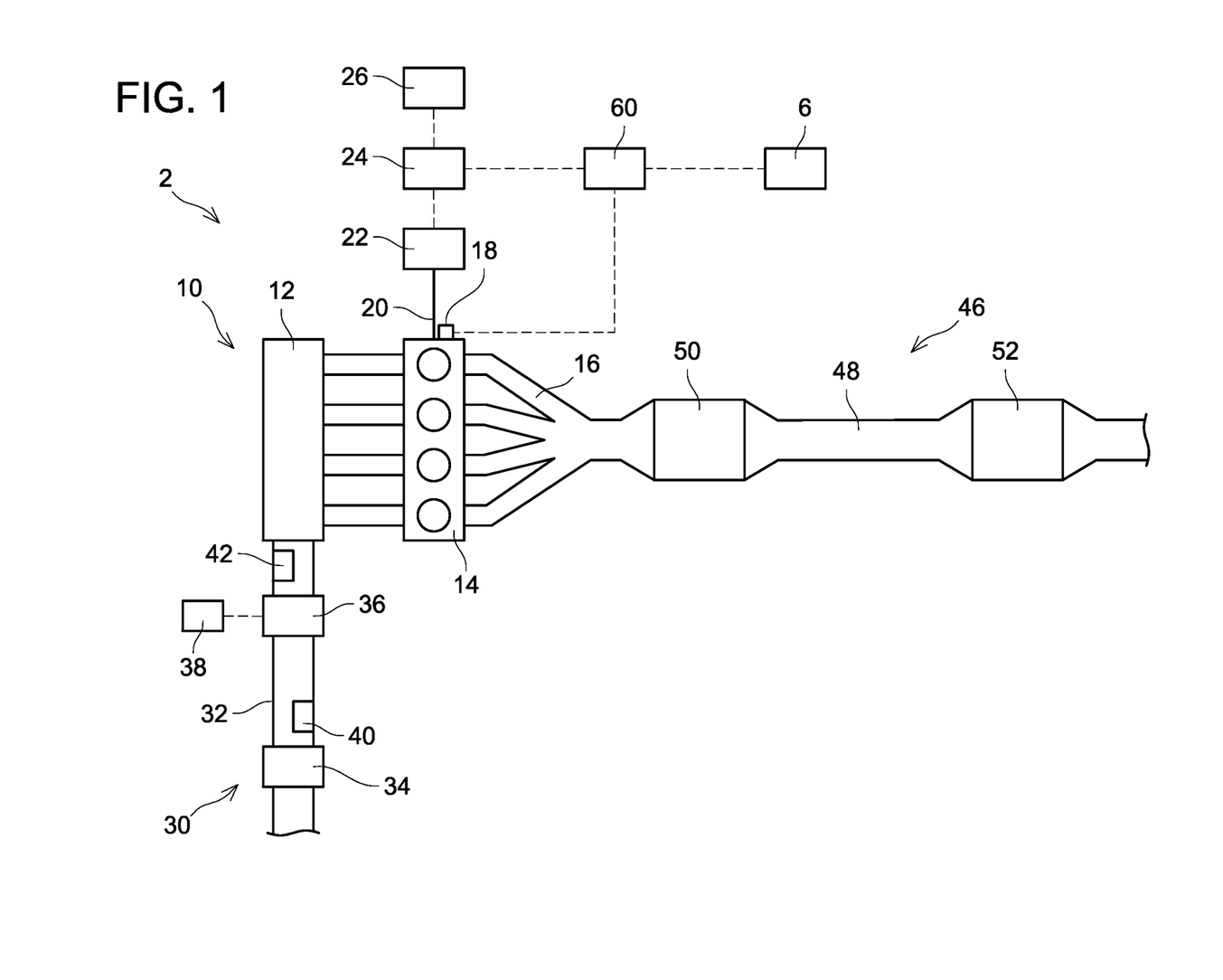
FIG. 1 schematically shows a hybrid vehicle of an embodiment.

As shown in FIG. 1, the hybrid vehicle 2 comprises an accelerating operation sensor 6, the engine 10, an electric generator 22, a battery 24, a traction motor 26, an intake unit 30, an exhaust unit 46, and a control device 60. The accelerating operation sensor 6 is configured to detect how much a driver of the hybrid vehicle 2 pressed down an accelerator pedal (not shown) (hereinbelow termed "pressed amount").

The engine 10 comprises an intake manifold 12, an engine body 14, an exhaust manifold 16, and a revolution speed sensor 18. The engine body 14 is connected to the intake manifold 12 and the exhaust manifold 16. A revolution speed of the engine body 14 changes according to for example the pressed amount detected by the accelerating operation sensor 6. The revolution speed sensor 18 is configured to detect a revolution speed of a crankshaft 20 of the engine body 14.

The electric generator 22 is connected to the crankshaft 20 of the engine body 14. The electric generator 22 is for example an alternator. The electric generator 22 is configured to generate electric power by revolution of the crankshaft 20. That is, the engine 10 operates to generate the electric power by the electric generator 22.

The battery 24 is electrically connected to the electric generator 22. The battery 24 is for example a lithium-ion battery. The battery 24 is configured to store the electric power generated by the electric generator 22. Further, the battery 24 is configured to supply the stored electric power to the traction motor 26. Due to this, the traction motor 26 operates and the hybrid vehicle 2 thereby travels.

The intake unit 30 comprises an intake pipe 32, a filter 34, a throttle valve 36, a throttle motor 38, a flow rate sensor 40, and a pressure sensor 42. The intake pipe 32 is connected to the intake manifold 12. Air flows in the intake pipe 32 from outside the hybrid vehicle 2 toward the intake manifold 12. The filter 34 is configured to collect foreign particles contained in the air flowing in the intake pipe 32.

The throttle valve 36 is disposed inside the intake pipe 32. The throttle valve 36 is for example a butterfly valve. When the throttle valve 36 opens, the air can flow toward the intake manifold 12. An amount of the air that flows through the throttle valve 36 and is supplied to the engine 10 increases when an aperture of the throttle valve 36 is larger.

The throttle motor 38 is connected to the throttle valve 36. The throttle motor 38 is for example a stepping motor. The throttle motor 38 is configured to operate the throttle valve 36. Due to this, the aperture of the throttle valve 36 is adjusted.

The flow rate sensor 40 and the pressure sensor 42 are disposed inside the intake pipe 32. The flow rate sensor 40 is configured to detect the amount of air flowing in the intake pipe 32. The pressure sensor 42 is configured to detect a pressure in the intake pipe 32.

The exhaust unit 46 comprises an exhaust pipe 48, a catalytic device 50, and a filter 52. The exhaust pipe 48 is connected to the exhaust manifold 16. Exhaust gas discharged from the engine 10 flows in the exhaust pipe 48 from the exhaust manifold 16 toward the outside of the hybrid vehicle 2.

The catalytic device 50 and the filter 52 are disposed inside the exhaust pipe 48. The catalytic device 50 is for example a three-way catalyst. The catalytic device 50 is configured to detoxicate carbon hydrate, carbon monoxide, and nitric oxide contained in the exhaust gas by chemical reaction. The detoxicated exhaust gas is discharged to the outside of the hybrid vehicle 2. The filter 52 is configured to collect microparticles contained in the exhaust gas, for example.

The control device 60 is incorporated in an Engine Control Unit (ECU). The control device 60 includes a CPU and a memory such as a ROM or a RAM. The control device 60 is electrically connected to each of the accelerating operation sensor 6, the engine body 14, the revolution speed sensor 18, the electric generator 22, the battery 24, the throttle motor 38, the flow rate sensor 40, and the pressure sensor 42. FIG. 1 only depicts a connection line between the control device 60 and the accelerating operation sensor 6, a connection line between the control device 60 and the revolution speed sensor 18, and a connection line between the control device 60 and the battery 24. The control device 60 is configured to control the engine body 14, the electric generator 22, the battery 24, and the throttle motor 38. The control device 60 is configured to receive signals from the accelerating operation sensor 6, the revolution speed sensor 18, the flow rate sensor 40, and the pressure sensor 42.

Next, processes performed by the control device 60 will be described. In the present embodiment, the hybrid vehicle 2 does not have an aperture detection sensor configured to directly detect an actual aperture of the throttle valve 36. Due to this, the control device 60 performs an aperture estimation process of estimating the actual aperture of the throttle valve 36. The aperture estimation process is performed when the hybrid vehicle 2 is traveling using the electric power stored in the battery 24.

Figure 2:
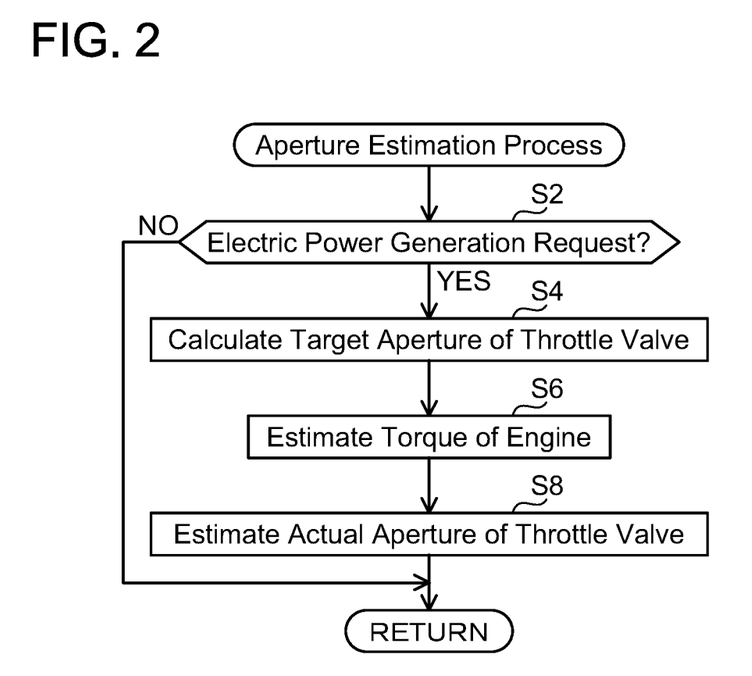
FIG. 2 is a flowchart of an aperture estimation process of the embodiment.

In the aperture estimation process shown in FIG. 2, in S2, the control device 60 determines whether an electric power generation request needs to be made to the electric generator 22. The control device 60 determines that the electric power generation request needs to be made to the electric generator 22 for example when an amount of the electric power remaining in the battery 24 becomes equal to or less than a predetermined value or when the pressed amount of the accelerator pedal by the driver of the hybrid vehicle 2 becomes equal to or greater than a predetermined amount. When the electric power generation request does not need to be made (NO in S2), the control device 60 terminates the aperture estimation process. In this case, since the engine 10 does not operate, the hybrid vehicle 2 travels in the state where the electric power is not generated by the electric generator 22. That is, the hybrid vehicle 2 travels by using the electric power stored in the battery 24. On the other hand, when the electric power generation request needs to be made (YES in S2), the control device 60 proceeds to S4.

In S4, the control device 60 calculates a target aperture of the throttle valve 36 from the pressed amount of the accelerator pedal detected by the accelerating operation sensor 6 and the amount of the electric power remaining in the battery 24 using a data map related to the target aperture of the throttle valve 36. In the data map related to the target aperture of the throttle valve 36, the larger the pressed amount of the accelerator pedal is, the larger the target aperture is, and the less electric power remains in the battery 24, the larger the target aperture is. The control device 60 stores the data map related to the target aperture of the throttle valve 36 in advance. Further, after the control device 60 has calculated the target aperture of the throttle valve 36, it operates the engine 10 and starts electric power generation by the electric generator 22.

In S6, the control device 60 estimates torque of the engine 10 from a revolution speed of the crankshaft 20 detected by the revolution speed sensor 18 and an output current value of the electric generator 22 by using a data map related to the torque of the engine 10. In the data map related to the torque of the engine 10, the higher the revolution speed of the crankshaft 20 is, the larger the torque of the engine 10 is, and the higher the output current value of the electric generator 22 is, the larger the torque of the engine 10 is. That is, the torque of the engine 10 is correlated with each of the revolution speed of the crankshaft 20 and the output current value of the electric generator 22. The control device 60 stores the data map related to the torque of the engine 10 in advance.

In S8, the control device 60 estimates the actual aperture of the throttle valve 36 from the estimated torque of the engine 10 and the revolution speed of the crankshaft 20 by using a data map related to the estimated aperture of the throttle valve 36. In the data map related to the estimated aperture of the throttle valve 36, the higher the torque of the engine 10 is, the larger the estimated aperture of the throttle valve 36 is, and the higher the revolution speed of the crankshaft 20 is, the larger the estimated aperture of the throttle valve 36 is. The control device 60 stores the data map related to the estimated aperture of the throttle valve 36 in advance.

After this, based on the actual aperture estimated in S8, the control device 60 controls the throttle motor 38 and performs feedback control so that the aperture of the throttle valve 36 is adjusted to the target aperture. Due to this, the aperture of the throttle valve 36 is accurately adjusted to the target aperture.

Figure 3:
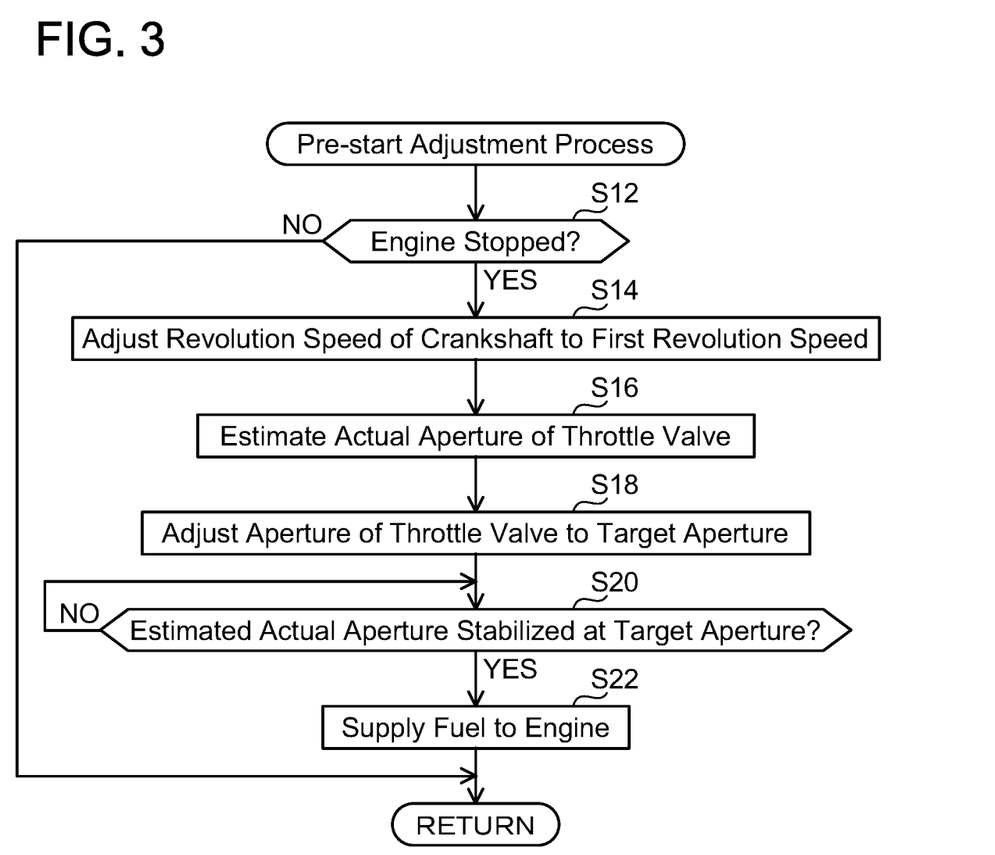
FIG. 3 is a flowchart of a pre-start adjustment process of the embodiment.

Further, in the present embodiment, before the hybrid vehicle 2 starts to operate, the control device 60 performs a pre-start adjustment process when the traction motor 26 is operating using the electric power stored in the battery 24 without the electric generator 22 generating electric power, and/or when the engine of the hybrid vehicle 2 is stopped by a start-stop system. The pre-start adjustment process is performed when an ignition switch of the hybrid vehicle 2 is on. In the pre-start adjustment process, the fuel is supplied to the engine 10 after the aperture of the throttle valve 36 has been adjusted.

In the pre-start adjustment process shown in FIG. 3, in S12, the control device 60 determines whether the engine 10 is stopped. The engine 10 being stopped hereof refers for example to a case where the hybrid vehicle 2 is parked before it starts to operate, a case where the traction motor 26 is operating using the electric power stored in the battery 24 without the electric generator 22 generating electric power, and/or a case where the engine of the hybrid vehicle 2 is stopped by the start-stop system. The control device 60 determines that the engine 10 is stopped when the revolution speed of the crankshaft 20 is zero, while determines that the engine 10 is operating when the revolution speed of the crankshaft 20 is greater than zero. Further, when the engine 10 is stopped, the control device 60 adjusts the aperture of the throttle valve 36 to a first aperture. The first aperture is for example 5 degrees or less. Hereinbelow, a state in which the aperture of the throttle valve 36 is in the first aperture will be termed as that the throttle valve 36 is closed. The control device 60 stores the first aperture in advance. When the engine 10 is not stopped (NO in S12), the control device 60 terminates the pre-start adjustment process. On the other hand, when the engine 10 is stopped (YES in S12), the control device 60 proceeds to S14.

In S14, the control device 60 forcibly operates the engine 10. Specifically, the control device 60 supplies the electric power stored in the battery 24 to the electric generator 22. The electric generator 22 causes the crankshaft 20 to revolve by this supplied electric power. The engine 10 operates by the revolution of the crankshaft 20. That is, the engine 10 operates forcibly using the electric power that was stored in the battery 24 rather than operating by combustion of the supplied fuel. The revolution speed of the crankshaft 20 can be adjusted as desired by adjusting the electric power supplied to the electric generator 22.

Further, in S14, the control device 60 adjusts the revolution speed of the crankshaft 20 from zero to a first revolution speed. Further, simultaneously as adjusting the revolution speed of the crankshaft 20, the control device 60 calculates a predetermined aperture of the throttle valve 36 corresponding to the first revolution speed by using a data map indicating a relationship between the revolution speed of the crankshaft 20 and the aperture of the throttle valve 36, and adjusts the aperture of the throttle valve 36 to the predetermined aperture. The control device 60 stores the data map indicating the relationship between the first revolution speed, the revolution speed of the crankshaft 20 and the aperture of the throttle valve 36 in advance. Hereinbelow, forcibly operating the engine 10 using the electric power that is stored in the battery 24 to adjust the revolution speed of the crankshaft 20 and the aperture of the throttle valve 36 will be termed "motoring".

In S16, the control device 60 estimates the actual aperture of the throttle valve 36 from the torque of the engine 10 and the revolution speed of the crankshaft 20 by using the data map related to the estimated aperture of the throttle valve 36. In a variant, the control device 60 may estimate the actual aperture of the throttle valve 36 from a current value of the throttle motor 38, the amount of air detected by the flow rate sensor 40, and/or the pressure in the intake pipe 32 detected by the pressure sensor 42.

In S18, when the accelerator pedal is pressed by the driver of the hybrid vehicle 2, the control device 60 calculates the target aperture of the throttle valve 36 from the pressed amount of the accelerator pedal detected by the accelerating operation sensor 6 and the amount of the electric power remaining in the battery 24 by using the data map related to the target aperture of the throttle valve 36. Then, the control device 60 performs the feedback control so that the aperture of the throttle valve 36 is adjusted to the target aperture based on the actual aperture estimated in S16. The control device 60 continues to estimate the actual aperture of the throttle valve 36 while the feedback control is performed.

In S20, the control device 60 determines whether the estimated actual aperture is stabilized at the target aperture. Here, the estimated actual aperture being stabilized at the target aperture means for example that the estimated actual aperture is maintained at the target aperture over a predetermined period (such as 0.5 seconds). When the estimated actual aperture is not stabilized at the target aperture (NO in S20), the control device 60 performs the feedback control to adjust the aperture of the throttle valve 36 to the target aperture until the estimated actual aperture is stabilized at the target aperture. On the other hand, when the estimated actual aperture is stabilized at the target aperture (YES in S20), the control device 60 proceeds to S22.

In S22, the control device 60 terminates the motoring in the state where the estimated actual aperture is stabilized at the target aperture and supplies the fuel to the engine 10. The engine 10 operates by the combustion of the fuel supplied to the engine 10. Due to this, the crankshaft 20 rotates in the state where the aperture of the throttle valve 36 is accurately adjusted to the target aperture, and the electric generator 22 generates electric power.

Figure 4:
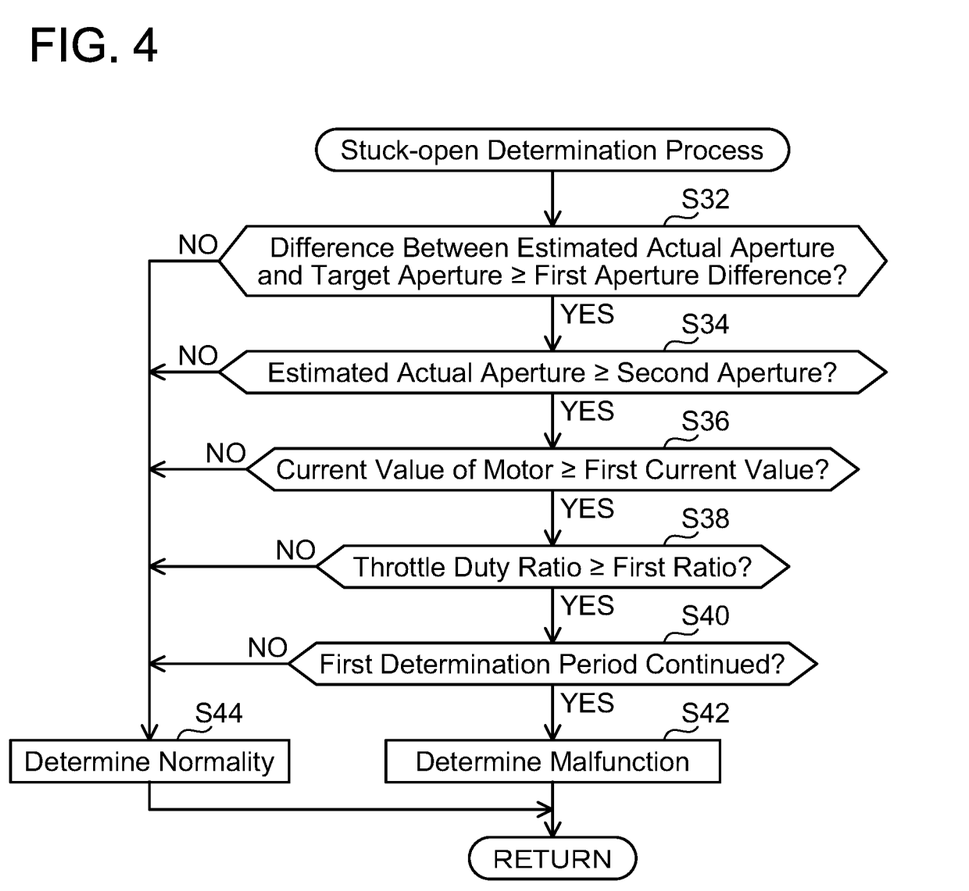
FIG. 4 is a flowchart of a stuck-open determination process of the embodiment.

Further, in the present embodiment, while the battery 24 is charged with the electric power, the aperture of the throttle valve 36 is continuously adjusted in accordance with the revolution speed of the crankshaft 20. In this state, for example, there may be a case where the throttle valve 36 malfunctions by being stuck open due to a foreign particle being caught in the throttle valve 36. The control device 60 performs a stuck-open determination process for determining whether the throttle valve 36 is malfunctioning by being stuck open.

In the stuck-open determination process shown in FIG. 4, in S32, the control device 60 determines whether a difference between the estimated actual aperture and the target aperture is equal to or greater than a first aperture difference. Here, the control device 60 determines that the difference between the estimated actual aperture and the target aperture is equal to or greater than the first aperture difference when a period during which the difference between the estimated actual aperture and the target aperture is equal to or greater than the first aperture difference continues for a first period. The first period is for example 0.5 seconds. Further, the first aperture difference is for example 10 degrees. The control device 60 estimates the actual aperture of the throttle valve 36 by performing the same processes as S6 and S8 of the aforementioned aperture estimation process. Further, the control device 60 calculates the target aperture of the throttle valve 36 by performing the same processes as S4 of the aforementioned aperture estimation process. The first aperture difference and the first period are stored in the control device 60 in advance. When the difference between the estimated actual aperture and the target aperture is smaller than the first aperture difference (NO in S32), the control device 60 determines in S44 that the throttle valve 36 is operating normally. That is, the control device 60 continues the electric power generation by the electric generator 22 without changing a condition of the electric power generation by the electric generator 22 (such as the revolution speed of the crankshaft 20 or the aperture of the throttle valve 36). On the other hand, when the difference between the estimated actual aperture and the target aperture is equal to or greater than the first aperture difference (YES in S32), the control device 60 proceeds to S34.

In S34, the control device 60 determines whether the estimated actual aperture is equal to or greater than a second aperture. The second aperture is larger than the first aperture in S12 of the pre-start adjustment process. The second aperture is for example 30 degrees. The second aperture is stored in the control device 60 in advance. When the estimated actual aperture is smaller than the second aperture (NO in S34), the control device 60 proceeds to S44. On the other hand, when the estimated actual aperture is equal to or greater than the second aperture (YES in S34), the control device 60 proceeds to S36.

In S36, the control device 60 determines whether the current value of the throttle motor 38 is equal to or greater than a first current value. When torque for opening and closing the throttle valve 36 is large, the current value of the throttle motor 38 becomes large. The first current value is greater than a current value for operating the throttle valve 36 in a normal state, and is for example 2 amperes. The control device 60 stores the first current value in advance. When the current value of the throttle motor 38 is smaller than the first current value (NO in S36), the control device 60 proceeds to S44. On the other hand, when the current value of the throttle motor 38 is equal to or greater than the first current value (YES in S36), the control device 60 proceeds to S38.

In S38, the control device 60 determines whether a throttle duty ratio of the throttle motor 38 is equal to or greater than a first ratio. The throttle duty ratio is an amount of adjustment of the aperture of the throttle valve 36 calculated from a deviation of the estimated actual aperture relative to the target aperture. The larger deviation of the estimated actual aperture relative to the target aperture is, the larger the throttle duty ratio is. The larger the throttle duty ratio is, the larger the amount of adjustment of the aperture of the throttle valve 36 per unit time is. The first ratio is for example 70%. The control device 60 stores the first ratio in advance. When the throttle duty ratio is smaller than the first ratio (NO in S38), the control device 60 proceeds to S44. On the other hand, when the throttle duty ratio is equal to or greater than the first ratio (YES in S38), the control device 60 proceeds to S40.

In S40, the control device 60 determines whether a period during which the estimated actual aperture is equal to or greater than the second aperture, the current value of the throttle motor 38 is equal to or greater than the first current value, and the throttle duty ratio of the throttle motor 38 is equal to or greater than the first ratio continues for a first determination period. The first determination period is for example 0.5 seconds. The control device 60 stores the first determination period in advance. When the above period does not continue for the first determination period (NO in S40), the control device 60 proceeds to S44. On the other hand, when the above period continues for the first determination period (YES in S40), the control device 60 determines in S42 that the throttle valve 36 is malfunctioning. When this determination that the throttle valve 36 is malfunctioning is made, the control device 60 notifies a warning. For example, a display indicating that the throttle valve 36 is malfunctioning is displayed on a dashboard of a driver's seat in the hybrid vehicle 2. Due to this, the driver of the hybrid vehicle 2 can recognize that the throttle valve 36 is malfunctioning.

Figure 5:
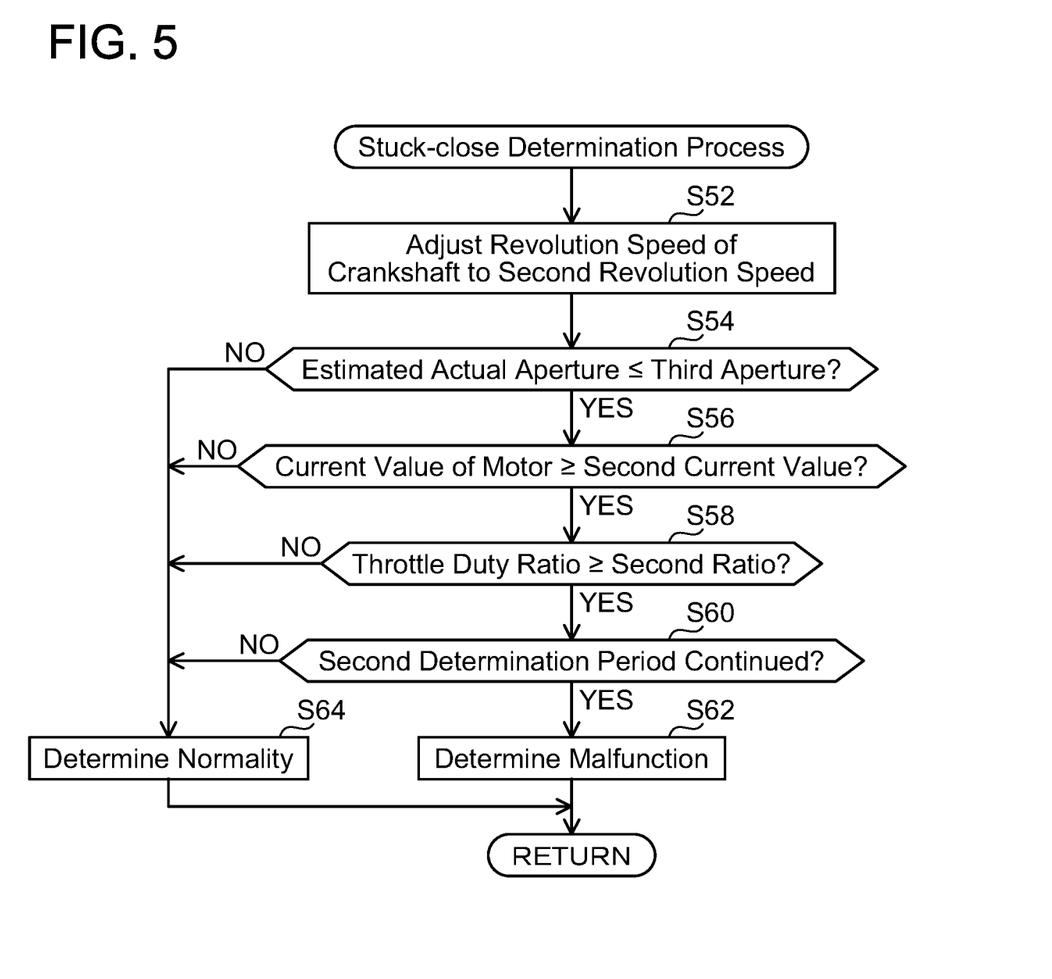
FIG. 5 is a flowchart of a stuck-close determination process of the embodiment.

Further, in the present embodiment, the aperture of the throttle valve 36 is adjusted to the first aperture when the engine 10 is stopped. That is, the throttle valve 36 is adjusted to a closed state. After this, when the engine 10 reoperates, there may be a case where the throttle valve 36 malfunctions by being stuck close. The control device 60 performs a stuck-close determination process for determining whether the throttle valve 36 is malfunctioning by being stuck close. The stuck-close determination process is performed while the engine 10 is stopped, such as in the case where the hybrid vehicle 2 is parked before it starts to operate, the case where the traction motor 26 is operating using the electric power stored in the battery 24 without the electric generator 22 generating electric power, and/or the case where the engine of the hybrid vehicle 2 is stopped by the start-stop system.

In the stuck-close determination process shown in FIG. 5, in S52, the control device 60 performs the motoring. Specifically, the control device 60 adjusts the revolution speed of the crankshaft 20 from zero to a second revolution speed. Further, the control device 60 performs control to adjust the aperture of the throttle valve 36 to a second aperture corresponding to the second revolution speed. In the present embodiment, the second revolution speed is the same as the first revolution speed in S14 of the pre-start adjustment process, and the second aperture is the same as the predetermined aperture in S14 of the pre-start adjustment process.

In S54, the control device 60 determines whether the estimated actual aperture of the throttle valve 36 is equal to or smaller than a third aperture during a control period of adjusting the aperture of the throttle valve 36 to the second aperture. The control device 60 estimates the actual aperture of the throttle valve 36 by performing the same processes as S6 and S8 of the aforementioned aperture estimation process. In the present embodiment, the third aperture is the same as the first aperture and is for example 5 degrees or less. The control device 60 stores the third aperture in advance. When the estimated actual aperture is greater than the third aperture (NO in S54), the control device 60 determines in S64 that the throttle valve 36 is operating normally. On the other hand, when the estimated actual aperture is equal to or smaller than the third aperture (YES in S54), the control device 60 proceeds to S56.

In S56, the control device 60 determines whether the current value of the throttle motor 38 is equal to or greater than a second current value. In the present embodiment, the second current value is the same as the first current value and is for example 2 amperes. The control device 60 stores the second current value in advance. When the current value of the throttle motor 38 is smaller than the second current value (NO in S56), the control device 60 proceeds to S64. On the other hand, when the current value of the throttle motor 38 is equal to or greater than the second current value (YES in S56), the control device 60 proceeds to S58.

In S58, the control device 60 determines whether the throttle duty ratio of the throttle motor 38 is equal to or greater than a second ratio. The second ratio is for example 70%. The control device 60 stores the second ratio in advance. When the throttle duty ratio is smaller than the second ratio (NO in S58), the control device 60 proceeds to S64. On the other hand, when the throttle duty ratio is equal to or greater than the second ratio (YES in S58), the control device 60 proceeds to S60.

In S60, the control device 60 determines whether a period during which the estimated actual aperture is equal to or less than the third aperture, the current value of the throttle motor 38 is equal to or greater than the second current value, and the throttle duty ratio is equal to or greater than the second ratio continues for a second determination period within the control period. In the present embodiment, the second period is the same as the first period and is for example 0.5 seconds. The control device 60 stores the second period in advance. When the above period does not continue for the second determination period (NO in S60), the control device 60 proceeds to S64. On the other hand, when the above period continues for the second determination period (YES in S60), the control device 60 determines in S62 that the throttle valve 36 is malfunctioning. When it is determined that the throttle valve 36 is malfunctioning, a display indicating that the throttle valve 36 is malfunctioning is displayed on the dashboard of the driver's seat in the hybrid vehicle 2 as with S42 of the aforementioned stuck-open determination process.

(Effect)

The control device 60 of the embodiment has been described as above. The control device 60 disclosed herein is the control device 60 of the hybrid vehicle 2, the hybrid vehicle 2 comprising: the engine 10; the electric generator 22 configured to generate electric power by operation of the engine 10; the battery 24 configured to store the electric power generated by the electric generator 22; the traction motor 26 configured to operate by the electric power stored in the battery 24; and the throttle valve 36 configured to adjust the amount of air to be supplied to the engine 10. The control device 60 is configured to control the aperture of the throttle valve 36 to the target aperture. The control device 60 is configured to estimate the torque of the engine 10 based on the output current value of the electric generator 22 while the battery 24 is charged with the electric power. The control device 60 is configured to estimate the actual aperture of the throttle valve 36 based on the estimated torque and the revolution speed of the engine 10. The control device 60 is configured to perform feedback control so that the aperture of the throttle valve 36 is adjusted to the target aperture based on the estimated actual aperture. According to this configuration, the control device 60 estimates the actual aperture of the throttle valve 36 using the output current value of the electric generator 22 while the battery 24 is charged with the electric power. The output current value of the electric generator 22 is correlated with the output of the engine 10 (that is, the torque thereof). Further, the output of the engine 10 is correlated with the amount of air supplied to the engine 10 (that is, the aperture of the throttle valve 36). Due to this, the aperture of the throttle valve 36 (that is, the actual aperture) can be estimated based on the output current value of the electric generator 22. The control device 60 as above exploits these relationships to accurately adjust the aperture of the throttle valve 36 without using an aperture sensor or a pressure sensor.

The control device 60 is configured to supply the electric power stored in the battery to the electric generator 22. The electric generator 22 is configured to forcibly operate the engine 10 by the supplied electric power in a state in which fuel is not supplied to the engine 10. The control device 60 is configured to adjust the aperture of the throttle valve 36 to the first aperture when the engine 10 is stopped. The control device 60 is configured to supply the electric power stored in the battery 24 to the electric generator 22 and adjust the revolution speed of the engine 10 from zero to the first revolution speed in the state in which the fuel is not supplied to the engine 10. The control device 60 is configured to estimate the actual aperture of the throttle valve 36 at the first revolution speed. The control device 60 is configured to perform feedback control so that the aperture of the throttle valve 36 is adjusted to the target aperture based on the estimated actual aperture. According to this configuration, when the battery 24 is not charged with the electric power, that is, when the engine 10 is stopped, the control device 60 forcibly operates the engine 10 using the electric power stored in the battery 24. Due to this, the control device 60 can estimate the actual aperture of the throttle valve 36 before the engine 10 starts to operate using fuel supplied thereto. As a result, when the engine 10 operates to charge the battery 24 with the electric power (that is, when the engine 10 operates by the fuel supplied to the engine 10), the control device 60 can accurately adjust the aperture of the throttle valve 36.

The hybrid vehicle 2 further comprises the accelerating operation sensor 6 configured to detect the operation amount of the acceleration pedal operated by the driver. The control device 60 is configured to calculate the target aperture of the throttle valve 36 based on the operation amount detected by the accelerating operation sensor 6 and the amount of the electric power remaining in the battery 24. The control device 60 is configured to perform feedback control so that the aperture of the throttle valve 36 is adjusted to the target aperture based on the estimated actual aperture. According to this configuration, the target aperture of the throttle valve 36 is calculated based on the operation amount detected by the accelerating operation sensor 6 and the amount of electric power remaining in the battery 24. Due to this, the control device 60 can accurately adjust the aperture of the throttle valve 36 to the target aperture based on the estimated actual aperture of the throttle valve 36.

The control device 60 is configured to determine that the throttle valve 36 is malfunctioning in the case in which the period during which the difference between the estimated actual aperture and the target aperture is equal to or greater than the first aperture difference continues for the first period while the battery 24 is charged with the electric power. According to this configuration, the control device 60 determines whether the throttle valve 36 is malfunctioning based on the actual aperture of the throttle valve 36 estimated while the battery 24 is charged with the electric power. Due to this, determination on whether the throttle valve 36 is malfunctioning can be made without using the aperture sensor.

The control device 60 is configured to supply the electric power stored in the battery 24 to the electric generator 22 and adjust the revolution speed of the engine 10 to the second revolution speed from the state in which the engine 10 is stopped. The control device 60 is configured to determine that the throttle valve 36 is malfunctioning in the case in which the period during which the estimated actual aperture is smaller than or equal to the third aperture that is smaller than the second aperture continues for the second period within the control period during which the aperture of the throttle valve 36 is controlled to the second aperture corresponding to the second revolution speed. According to this configuration, the control device 60 determines whether the throttle valve 36 is malfunctioning based on the actual aperture of the throttle valve 36 estimated while the engine 10 is forcibly operated. Due to this, the determination on whether the throttle valve 36 is malfunctioning can be made without using the aperture sensor.

The hybrid vehicle 2 further comprises the throttle motor 38 configured to operate the throttle valve 36. The control device 60 is configured to determine that the throttle valve 36 is malfunctioning in the case in which the period during which the difference between the estimated actual aperture and the target aperture is equal to or greater than the first aperture difference continues for the first period and the current value of the throttle motor 38 is equal to or greater than the first current value while the battery 24 is charged with the electric power. According to this configuration, the control device 60 determines whether the throttle valve 36 is malfunctioning based on the current value of the throttle motor 38 and the actual aperture of the throttle valve 36 estimated while the battery 24 is charged with the electric power. Due to this, more accurate determination on whether the throttle valve 36 is malfunctioning can be made without using the aperture sensor.

The hybrid vehicle 2 further comprises the throttle motor 38 configured to operate the throttle valve 36. The control device 60 is configured to determine that the throttle valve 36 is malfunctioning in the case in which the period during which the estimated actual aperture is smaller than or equal to the third aperture continues for the second period and the current value of the throttle motor 38 is equal to or greater than the second current value. According to this configuration, the control device 60 determines whether the throttle valve 36 is malfunctioning based on the current value of the throttle motor 38 and the actual aperture of the throttle valve 36 estimated while the engine 10 is forcibly operated. Due to this, more accurate determination on whether the throttle valve 36 is malfunctioning can be made without using the aperture sensor.

(Corresponding Relationships)

The second determination period is an example of "second period". The accelerator pedal is an example of "acceleration member", and the accelerating operation sensor 6 is an example of "accelerating operation detector".

An embodiment has been described, however, specific implementation of the art disclosed herein is not limited to the above embodiment. In the description below, configurations that are the same as the configurations of the foregoing description will be given the same reference signs and detailed description thereof will be omitted.

(Variants)

(1) The traction motor 26 may not only operate by the electric power being supplied from the battery 24 but also by the electric power generated in the electric generator 22 being directly supplied thereto.

(2) The second revolution speed in S52 of the stuck-close determination process may be different from the first revolution speed in S14 of the pre-start adjustment process. The second current value in S56 of the stuck-close determination process may be different from the first current value in S36 of the stuck-open determination process. The second period in S60 of the stuck-close determination process may be different from the first period in S40 of the stuck-open determination process.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A control device of a hybrid vehicle, the hybrid vehicle comprising:
   an engine;
   an electric generator configured to generate electric power by operation of the engine;
   a battery configured to store the electric power generated by the electric generator;
   a traction motor configured to operate by the electric power stored in the battery; and
   a throttle valve configured to adjust an amount of air to be supplied to the engine, wherein
   the control device is configured to:
   control an aperture of the throttle valve to a target aperture;
   estimate torque of the engine based on an output current value of the electric generator while the battery is charged with the electric power;
   estimate an actual aperture of the throttle valve based on the estimated torque and revolution speed of the engine; and
   perform feedback control so that the aperture of the throttle valve is adjusted to the target aperture based on the estimated actual aperture,
   the control device is configured to supply the electric power stored in the battery to the electric generator,
   the electric generator is configured to forcibly operate the engine by the supplied electric power in a state in which fuel is not supplied to the engine, and
   the control device is configured to:
   adjust the aperture of the throttle valve to a first aperture when the engine is stopped;
   supply the electric power stored in the battery to the electric generator and adjust the revolution speed of the engine from zero to a first revolution speed in the state in which the fuel is not supplied to the engine;
   estimate the actual aperture of the throttle valve at the first revolution speed; and
   perform feedback control so that the aperture of the throttle valve is adjusted to the target aperture based on the estimated actual aperture.

2. A control device of a hybrid vehicle, the hybrid vehicle comprising:
   an engine;
   an electric generator configured to generate electric power by operation of the engine;
   a battery configured to store the electric power generated by the electric generator;
   a traction motor configured to operate by the electric power stored in the battery; and
   a throttle valve configured to adjust an amount of air to be supplied to the engine, wherein
   the control device is configured to:
   control an aperture of the throttle valve to a target aperture;
   estimate torque of the engine based on an output current value of the electric generator while the battery is charged with the electric power;
   estimate an actual aperture of the throttle valve based on the estimated torque and revolution speed of the engine; and
   perform feedback control so that the aperture of the throttle valve is adjusted to the target aperture based on the estimated actual aperture,
   the hybrid vehicle further comprises an accelerating operation detector configured to detect an operation amount of an acceleration member operated by a driver,
   the control device is configured to:
   calculate the target aperture of the throttle valve based on the operation amount detected by the accelerating operation detector and an amount of the electric power remaining in the battery; and
   perform feedback control so that the aperture of the throttle valve is adjusted to the target aperture based on the estimated actual aperture, and
   the control device is configured to determine that the throttle valve is malfunctioning in a case in which a period during which a difference between the estimated actual aperture and the target aperture is equal to or greater than a first aperture difference continues for a first period while the battery is charged with the electric power.

3. A control device of a hybrid vehicle, the hybrid vehicle comprising:
   an engine;
   an electric generator configured to generate electric power by operation of the engine;
   a battery configured to store the electric power generated by the electric generator;
   a traction motor configured to operate by the electric power stored in the battery; and
   a throttle valve configured to adjust an amount of air to be supplied to the engine, wherein
   the control device is configured to:
   control an aperture of the throttle valve to a target aperture;
   estimate torque of the engine based on an output current value of the electric generator while the battery is charged with the electric power;
   estimate an actual aperture of the throttle valve based on the estimated torque and revolution speed of the engine; and
   perform feedback control so that the aperture of the throttle valve is adjusted to the target aperture based on the estimated actual aperture, and
   the control device is configured to:
   supply the electric power stored in the battery to the electric generator and adjust the revolution speed of the engine to a second revolution speed from a state in which the engine is stopped; and determine that the throttle valve is malfunctioning in a case in which a period during which the estimated actual aperture is smaller than or equal to a third aperture that is smaller than a second aperture continues for a second period within a control period during which the aperture of the throttle valve is controlled to the second aperture corresponding to the second revolution speed.

4. The control device according to claim 2, wherein the hybrid vehicle further comprises a throttle motor configured to operate the throttle valve, and the control device is configured to determine that the throttle valve is malfunctioning in a case in which a period during which the difference between the estimated actual aperture and the target aperture is equal to or greater than the first aperture difference continues for the first period and a current value of the throttle motor is equal to or greater than a first current value while the battery is charged with the electric power.

5. The control device according to claim 3, wherein the hybrid vehicle further comprises a throttle motor configured to operate the throttle valve, and the control device is configured to determine that the throttle valve is malfunctioning in a case in which the period during which the estimated actual aperture is smaller than or equal to the third aperture continues for the second period and a current value of the throttle motor is equal to or greater than a second current value.

* * * * *